July 20, 1926.
L. B. SOLEMINK
TIRE VALVE
Filed Nov. 19, 1923
1,593,313
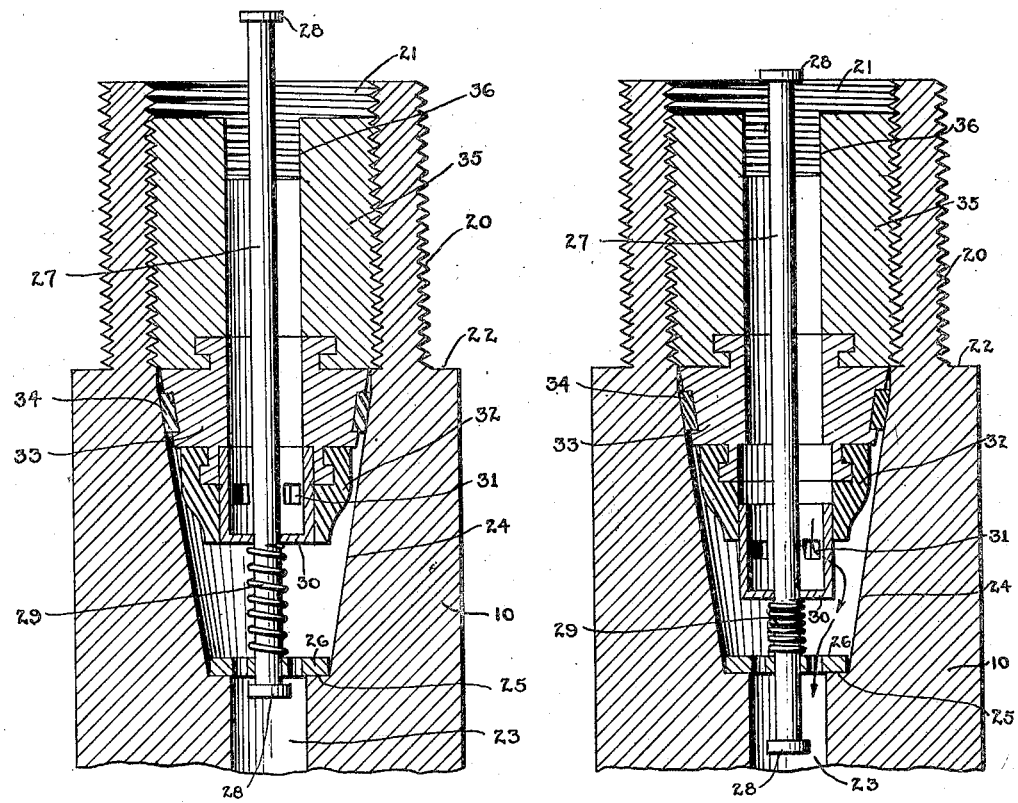
Inventor
Lloyd B. Solemink
By Lancaster and Allwine
Attorneys Patented July 20, 1926.

1,593,313

UNITED STATES PATENT OFFICE.

LLOYD B. SOLEMINK, OF SAN FRANCISCO, CALIFORNIA.

TIRE VALVE.

Application filed November 19, 1923. Serial No. 675,700.

The present invention relates to valves for tires and the like where it is desired to retain air or other gas under pressure.

An object of the invention is to provide an improved valve structure for insuring the correct seating of the valve and to prevent the frictional rubbing or twisting of the sealing packing of the valve in positioning and removing it relatively to the valve seat.

A further object of the invention is to provide a valve body embracing the above characteristics and which follows the structure of the conventional valve so that it may be readily incorporated in tire structures of the present type and which may be easily interchanged or substituted in either the original manufacture of a tube or in the repair or replacement of the valves of the same.

The above and various other objects and advantages of this invention will in part be described in and in part be understood from the following detailed description of the present preferred embodiment, the same being illustrated in the following drawings, wherein:

Fig. 1 is a fragmentary enlarged section taken longitudinally through the outer portion of the valve, the same being closed.

Fig. 2 is a similar view showing the valve open.

Referring to the drawing in detail, 10 designates a valve stem body the upper end of which may be reduced and externally threaded as at 20, and also provided at such upper end portion with internal threads 21 which are coextensive with the threads 20. The exterior threads 20 terminate in an outwardly facing shoulder 22 serving as an abutment for a cap or the like.

The body 10 of the valve stem has a central opening or bore 23 for the passage of air to and from the interior of the device to which the valve may be attached. The bore 23 has an inclined or flaring wall 24 providing a valve seat and at the inner end of the seat the body is provided with an outwardly facing shoulder 25 upon which is adapted to seat a guide disk or member 26 through which a valve stem 27 is slidably mounted. The stem 27 is upset at opposite ends to form stop heads 28 which limit the valve stem in its sliding movement through the several devices which are mounted on the stem. Above the disk 26 is a coil spring 29 having one end bearing upon the disk and its other end engaging a cup or cylinder 30 which is fixed to the stem 27 and which is closed at its lower end and open at its upper end. This cylinder or cup 30 is provided in one or more sides with openings 31 providing ports adapted to communicate the interior of the cup 30 with the interior of the valve body 10. The cup 30 is snugly embraced in a sleeve 32 which is of hard rubber or other suitable material for sealing the cup 30 when the latter is raised by the spring 29. This sleeve 32 is swivelled or otherwise suitably mounted upon the lower end of the valve plug 33 which is fitted in the upper end of the flaring portion 24 of the valve body.

The plug 33 has a downwardly tapering peripheral wall having an annular groove or depression therein for receiving a sealing ring 34 of rubber or the like adapted to firmly embrace the wall 24 and seal the plug in the valve body.

The plug 33 is mounted for rotation upon the lower end of a threaded nut or follower 35 which engages the threads 21 in the upper end of the valve body 10. The follower 35 has a relatively large opening axially thereof and which corresponds in diameter to that of the plug 33 and the cup 30. The follower 35 is also provided with a transverse kerf 36 adapted to receive the prongs of a suitable instrument for turning the follower 35 to either raise or lower the plug 33. The plug 33 is swivelled upon the lower end of the follower 35 and consequently the packing ring 34 is not abraded or chafed and thus is not submitted to the destructive frictional contact with the valve seat as is the case with tire valves of the present everyday type.

It is apparent that when air is compressed into the outer end of the stem body 10, such air passes down through the follower 35, the plug 33, and into the cup 30 forcing the latter inwardly against the tension of the spring 29 until the openings 31 pass the sleeve 32 as shown in Fig. 2. In this position air under pressure may freely pass through the valve stem and pass the guide 26 into the inner tube or other device to which the improved valve may be attached.

The cup or cylinder 30 is also adjusted into this position by depressing the outer end of the stem 27 manually or otherwise so that air under pressure at the inner end of the valve stem may freely escape outwardly through the openings 31 and the cup 30. The plug 33 is not rotated either in positioning it in the valve stem 10, or in removing the valve stem and the parts carried thereby.

It is of course understood that various changes and modifications may be made in the details of construction and design of the above specifically described embodiment without departing from the spirit of the invention, such changes and modifications being restricted only by the scope of the following claim.

What is claimed is:

A tire valve comprising a tubular stem body provided with an internal valve seat having an annular shoulder formed at its inner end, a plug removably seating in the valve seat, a sleeve of resilient material carried by the inner end of said plug and extending inwardly therefrom in spaced relation to the wall of said valve seat, a guide member seating on said annular shoulder, a valve stem slidably mounted in said guide member and extending outwardly through said plug and sleeve, a cylinder closed at its inner end and having lateral openings intermediate its ends, rigidly mounted upon the valve stem and slidable in said sleeve, and a spring coiled about the inner end of the valve stem and engaging the guide member and cylinder for normally urging the cylinder outwardly into a closed position in said sleeve.

LLOYD B. SOLEMINK.